United States Patent

Sawada et al.

(10) Patent No.: US 9,033,527 B2
(45) Date of Patent: May 19, 2015

(54) MIRROR DEVICE FOR VEHICLE

(75) Inventors: Kazuhiro Sawada, Aichi-ken (JP);
Shigeki Yoshida, Aichi-ken (JP);
Kenichi Mizutani, Aichi-ken (JP)

(73) Assignee: KABUSHIKI KAISHA TOKAI-RIKA-DENKI-SEISAKUSHO, Niwa-Gun, Aichi-Ken (JP)

( * ) Notice: Subject to any disclaimer, the term of this patent is extended or adjusted under 35 U.S.C. 154(b) by 384 days.

(21) Appl. No.: 13/591,557

(22) Filed: Aug. 22, 2012

(65) Prior Publication Data

US 2013/0050857 A1 Feb. 28, 2013

(30) Foreign Application Priority Data

Aug. 25, 2011 (JP) ................................. 2011-184038

(51) Int. Cl.
*B60R 1/074* (2006.01)

(52) U.S. Cl.
CPC ...................................... *B60R 1/074* (2013.01)

(58) Field of Classification Search
CPC .......... B60R 1/074; B60R 1/076; B60R 1/066
USPC ................................................. 359/841, 875
See application file for complete search history.

(56) References Cited

U.S. PATENT DOCUMENTS

2007/0035862 A1* 2/2007 Brouwer et al. ............. 359/841

FOREIGN PATENT DOCUMENTS

| DE | 10138021 | 2/2003 |
|---|---|---|
| JP | 2004-9806 | 1/2004 |
| JP | 2006-282088 | 10/2006 |
| JP | 2006-322466 | 11/2006 |
| JP | 2007-126863 | 5/2007 |
| JP | 2010-274744 | 12/2010 |

OTHER PUBLICATIONS

Japanese Office Action dated May 7, 2014 and English Translation of Notice of Reasons for Rejection.

* cited by examiner

*Primary Examiner* — Jennifer L. Doak
(74) *Attorney, Agent, or Firm* — Roberts Mlotkowski Safran & Cole, P.C.

(57) ABSTRACT

In a vehicle door mirror device, by a first fixed-face of a fixed projection of a stay and a first rotating-face of a rotating projection of a drive body contacting, further rotation of a mirror is inhibited when the mirror is disposed in a housed position. A slope-angle of the first fixed-face to the housing direction is smaller than a slope-angle of the first rotating-face to a forward folded direction. Contact between the upper end of the first fixed-face and the first rotating-face can accordingly be restricted, and a distance from the lower end of the first fixed-face to the contact position with the first rotating-face can be made short. So, moment acting on the first fixed-face from the first rotating-face can be made small, enabling damage to the lower end position of the first fixed-face to be suppressed. A reduction in weight and cost can accordingly be achieved.

10 Claims, 7 Drawing Sheets

US 9,033,527 B2

MIRROR DEVICE FOR VEHICLE

CROSS-REFERENCE TO RELATED APPLICATION

The application claims priority under 35 USC 119 from Japanese Patent Application No. 2011-184038 filed Aug. 25, 2011, the disclosure of which is incorporated by reference herein.

BACKGROUND OF THE INVENTION

1. Field of the Invention

The present invention relates to a mirror device for a vehicle in which a mirror is housed by rotating a rotating body with respect to a support body.

2. Related Art

Japanese Patent Application Laid-Open (JP-A) No. 2004-9806 discloses an outer mirror for a vehicle. A circular arc shaped groove is provided to a base, and a projection is provided projecting from a mirror assembly. Rotation of the mirror assembly with respect to the base is prevented (such that even manual movement by hand, for example, is not permitted) by an end face of the projection abutting an end portion of the circular arc shaped groove, and the mirror assembly is disposed at a front housed position or a rear housed position.

However, when an end at a projecting leading end side of the end face of the projection abuts the end portion of the circular arc shaped groove when preventing rotation of the mirror assembly with respect to the base, there is a large distance from a projecting base end of the end face of the projection to an abut-position with the circular arc shaped groove end portion. So, the moment acting on the projection is accordingly larger, with the possibility of damage to the projecting base end portion of the projection.

There is consequently a need to manufacture the projection from a high strength material or increase the size of the projection, resulting in an increase in cost and weight for the outer mirror for a vehicle.

SUMMARY OF THE INVENTION

In consideration of the above circumstances, the present invention is to obtain a mirror device for a vehicle capable of achieving a reduction in cost and weight.

A mirror device for a vehicle of a first aspect includes: a support body that is supported at a vehicle body side; a rotating body that is supported at the support body, the rotating body supporting a mirror of the vehicle and housing the mirror by rotating with respect to the support body; an inhibit portion that is provided at one of the support body or the rotating body; a projection portion that is provided so as to project from the other of the support body or the rotating body, and is provided with a contact face, rotation of the rotating body with respect to the support body being inhibited by the inhibit portion and the contact face making contact with each other in a state in which the inhibit portion and an end of the contact face at a side of a projecting leading end of the projection portion face each other; and a restricting structure that restricts contact between the inhibit portion and the end of the contact face at the side of the projecting leading end.

A mirror device for a vehicle of a second aspect is the mirror device for a vehicle of the first aspect wherein the restricting structure is configured by the contact face at a side of a projecting base end of the projecting portion projecting out with respect to the contact face at the side of the projecting leading end, towards a side of a direction of contact of the contact face with the inhibit portion.

A mirror device for a vehicle of a third aspect is the mirror device for a vehicle of the first or the second aspect wherein a side face of the projecting base end of the projection portion, at a side of contact with the inhibit portion, is curved.

A mirror device for a vehicle of a fourth aspect is the mirror device for a vehicle of any one of the first to the third aspects wherein a radius of curvature, of a contact portion of the inhibit portion with the contact face, is set smaller than a radius of curvature of the side face of the projection base end of the projection portion at the side of contact with the inhibit portion.

A mirror device for a vehicle of a fifth aspect includes: a support body that is supported at a vehicle body side; a rotating body that is supported at the support body, the rotating body supporting a mirror of the vehicle and housing the mirror by rotating with respect to the support body; an inhibit portion that is provided at one of the support body or the rotating body; a projection portion that is provided so as to project from the other of the support body or the rotating body, wherein the projection portion is a member that is curved along a rotating direction of the rotating body, an end portion thereof at one side in the rotating direction is a first projection portion face and an end portion thereof at the other side in the rotating direction is a second projection portion face, the inhibit portion is a member that is curved along a rotating direction of the rotating body, an end portion thereof at the other side in the rotating direction is a first inhibit portion face and an end portion thereof at the one side in the rotating direction is a second inhibit portion face, the first inhibit portion face, the second inhibit portion face, the first projection portion face and the second projection portion face are inclined surfaces that are inclined with respect to the rotating direction, rotation of the rotating body with respect to the support body is inhibited by the first inhibit portion face and the first projection portion face making contact with each other or by the second inhibit portion face and the second projection portion face making contact with each other, and a restricting structure is provided, which restricts contact between the first inhibit portion face and an end of the first projection portion face at a side of a projecting leading end of the projection portion and which restricts contact between the second inhibit portion face and an end of the second projection portion face at the side of the projecting leading end.

A mirror device for a vehicle of a sixth aspect is the mirror device for a vehicle of the fifth aspect wherein, in the restricting structure: a slope angle of the first projection portion face with respect to the other side in the rotating direction is set smaller than a slope angle of the first inhibit portion face with respect to the one side in the rotating direction, and a slope angle of the second projection portion face with respect to the one side in the rotating direction is set smaller than a slope angle of the second inhibit portion face with respect to the other side in the rotating direction.

In the mirror device for a vehicle of the first aspect, the rotating body is supported by the supporting body supported on the vehicle body side, and the rotating body supports the vehicle mirror. The mirror is housed by rotating the rotating body with respect to the supporting body.

Further, the inhibit portion is provided at one of the support body or the rotating body, and the projection portion is provided so as to project from the other of the support body or the rotating body, and is provided with a contact face, rotation of the rotating body with respect to the support body being inhibited by the inhibit portion and the contact face making contact with each other in a state in which the inhibit portion and an end of the contact face at a side of a projecting leading end of the projection portion face each other.

Here, the restricting structure restricts contact between the inhibit portion and the end of the contact face at the side of the projecting leading end.

Accordingly, when rotation of the rotating body with respect to the supporting body is inhibited, a distance from the projecting base end of the projection portion to the contact position with the inhibit portion can be made short. Damage to the projecting base end portion of the projection portion can accordingly be suppressed due to a moment acting on the projection portion can be made small.

A reduction in cost and weight for the mirror device for a vehicle can accordingly be achieved due to eliminating the need to manufacture the projection portion from a high strength material or increase the size of the projection portion.

In the mirror device for a vehicle of the second aspect, the restricting structure is configured by the contact face at a side of a projecting base end of the projecting portion projecting out with respect to the contact face at the side of the projecting leading end, towards a side of a direction of contact of the contact face with the inhibit portion. Accordingly, contact between the inhibit portion and the end of the contact face at the side of the projecting leading end can accordingly be appropriately restricted.

In the mirror device for a vehicle of the third aspect, a side face of the projecting base end of the projection portion, at a side of contact with the inhibit portion, is curved. Accordingly, damage to the projecting base end portion of the projection portion is accordingly further suppressed when rotation of the rotating body with respect to the supporting body is inhibited.

In the mirror device for a vehicle of the fourth aspect, a radius of curvature of a contact portion of the inhibit portion contacting with the projection portion (the contact face) is set smaller than a radius of curvature of the side face of the projection base end of the projection portion at the side of contact with the inhibit portion. When the rotation of the rotating body with respect to the support body is inhibited, the distance from the projecting base end of the projection portion to the contact position with the inhibit portion can accordingly be made appropriately short, so damage to the projecting base end portion of the projection portion can accordingly be appropriately suppressed since the moment acting on the projection portion can be made appropriately small.

BRIEF DESCRIPTION OF THE DRAWINGS

Exemplary embodiments of the present invention will be described in detail based on the following figures, wherein:

FIG. 1A illustrates a state in which the mirror is disposed in a housed position and FIG. 1B illustrates a state in which the mirror is disposed in a forward folded position;

FIG. 7A illustrates a state in which the mirror is disposed in a housed position and FIG. 7B illustrates a state in which the mirror is disposed in a forward folded position.

DETAILED DESCRIPTION OF THE INVENTION

First Exemplary Embodiment

Figure 3:
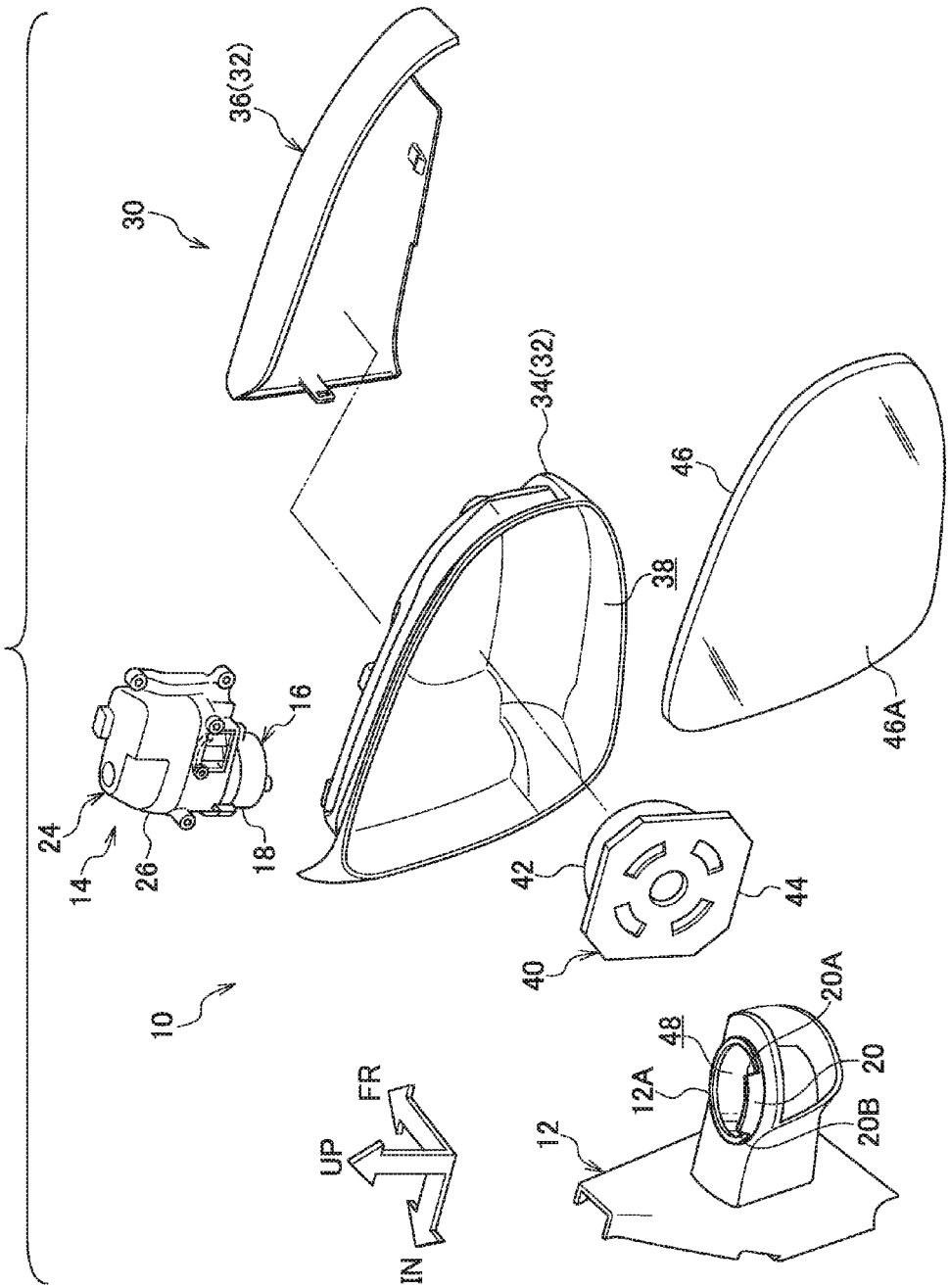
FIG. 3 is an exploded perspective view of a vehicle door mirror device according to the first exemplary embodiment of the present invention, as viewed diagonally from above the vehicle rear.

FIG. 3 is an exploded perspective view of a vehicle door mirror device 10 according to a first exemplary embodiment applied with the mirror device for a vehicle of the present invention, as seen diagonally from above the vehicle rear. In the drawings the vehicle front direction is indicated by arrow FR, the vehicle width direction inside direction (vehicle left direction) is indicated by the arrow IN, and the upper direction by the arrow UP.

The vehicle door mirror device 10 according to the present exemplary embodiment is provided at an outer portion at a vehicle front side end portion of the upper-lower direction intermediate portion of a vehicle door (not shown in the drawings).

Figure 2:
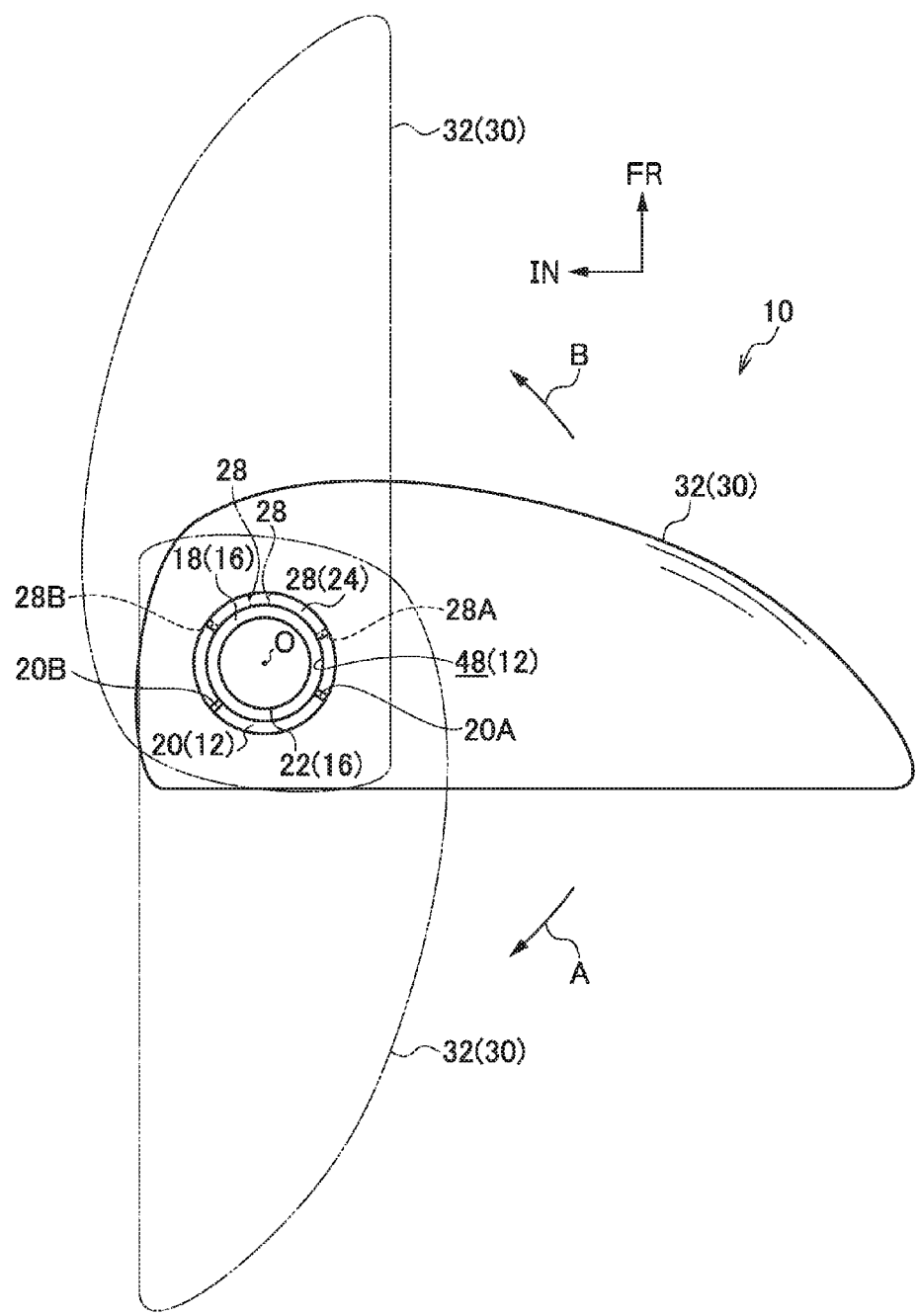
FIG. 2 is a plan view illustrating a vehicle door mirror device according to the first exemplary embodiment of the present invention, as viewed from above.
Figure 4:
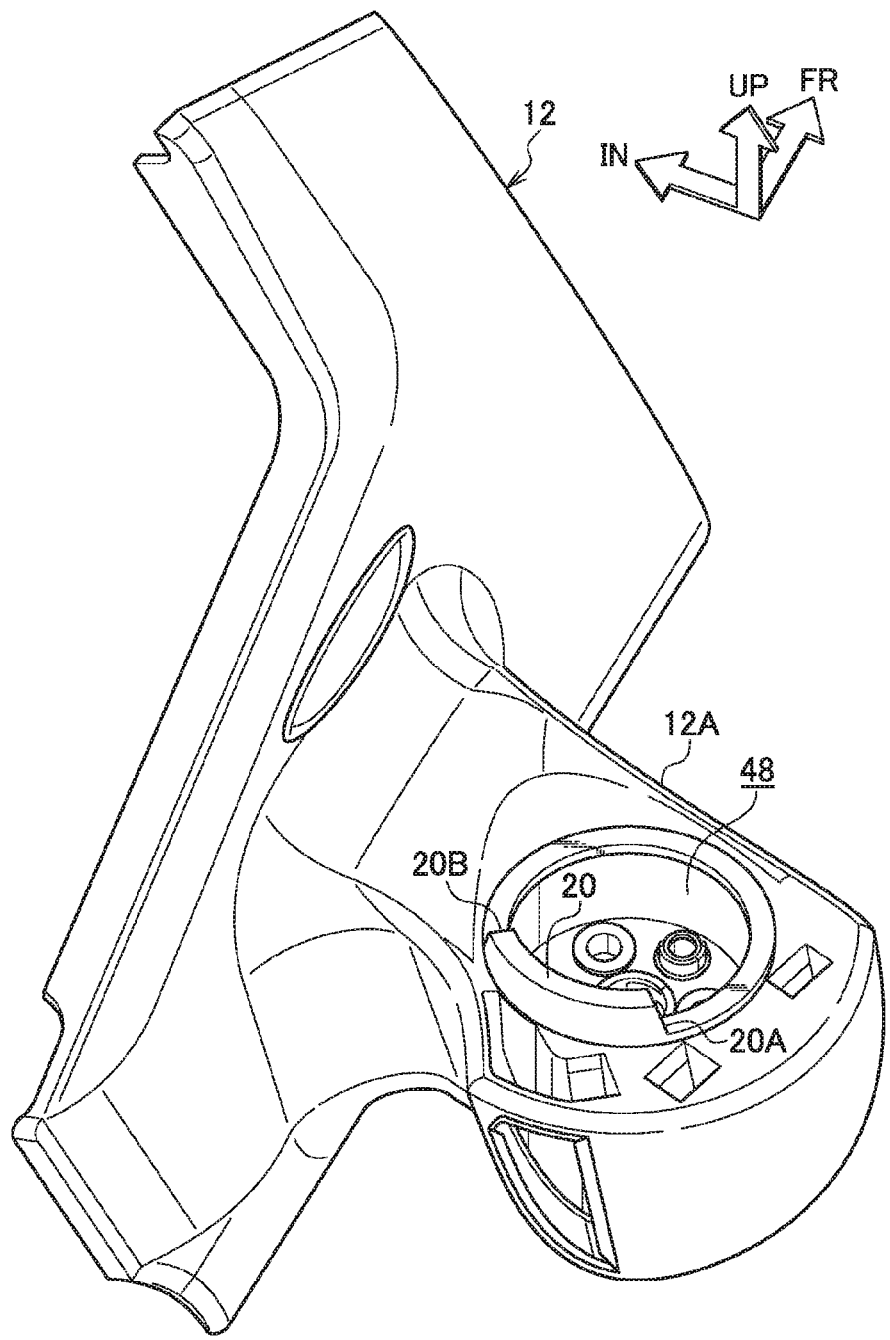
FIG. 4 is a perspective view illustrating a stay of a vehicle door mirror device according to the first exemplary embodiment of the present invention, as viewed diagonally from above the vehicle rear.

As shown in FIG. 2 to FIG. 4, at the vehicle width direction inside end portion of the vehicle door mirror device 10, a stay 12 is provided, which serves as a support member configuring a support body and made from resin (for example made from PA-G (nylon-glass fiber)). The stay 12 is attached to and supported by a vehicle door.

A substantially column shaped support projection 12A serving as a mount-portion is integrally provided to a vehicle width direction outside portion of the stay 12. The support projection 12A projects out to the vehicle width direction outside. A circular column shaped fix hole 48 is formed in the support projection 12A. The fix hole 48 is open towards the upper side, and a central axis line (the central axis line O in FIG. 2) is parallel to the upper-lower direction.

An elongated curved plate shaped fixed projection 20 (stopper), serving as a projection portion and high strength portion, is integrally formed to the top face of the support projection 12A at a portion of the periphery of the fix hole 48. The fixed projection 20 projects upwards, is elongated around the circumferential direction of the fix hole 48 and curves in a circular arc shape centered on the center axis line of the fix hole 48.

An end face of the fixed projection 20 on the forward folded direction (the front housing direction (one direction in rotating directions), the arrow B direction in FIG. 2) side is configured by a flat plane shaped first fixed face 20A that serves as a projection face (contact face and side face). The first fixed face 20A is disposed parallel to the radial direction of the fix hole 48. The first fixed face 20A slopes (inclines) towards the forward folded direction side on progression downwards (towards the projecting base end side of the fixed projection 20). The lower side portion of the first fixed face 20A projects out towards the forward folded direction side with respect to the upper side portion of the first fixed face 20A (the projecting leading (tip) end side of the fixed projection 20).

An end face of the fixed projection 20 on the housing direction (rear housing direction (the other direction in rotating directions), arrow A direction in FIG. 2) side is configured by a flat plate shaped second fixed face 20B that serves as a projection face (contact face and side face). The second fixed face 20B is disposed parallel to the radial direction of the fix hole 48. The second fixed face 20B slopes (inclines) towards the housing direction side on progression downwards. The lower side portion of the second fixed face 20B projects out towards the housing direction side with respect to the upper side portion of the second fixed face 20B.

Figure 1A:
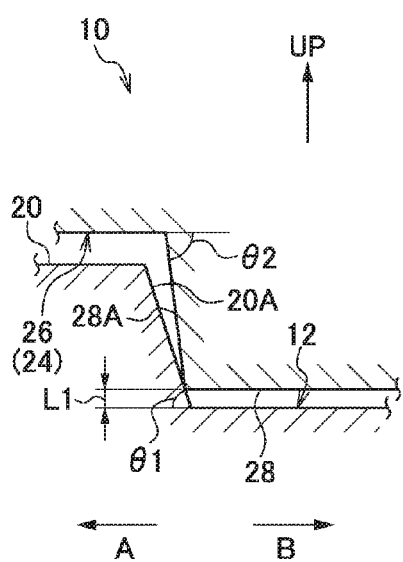
FIG. 1A and FIG. 1B are cross-sections illustrating main portions of a vehicle door mirror device according to a first exemplary embodiment of the present invention, as viewed from the side.
Figure 1B:
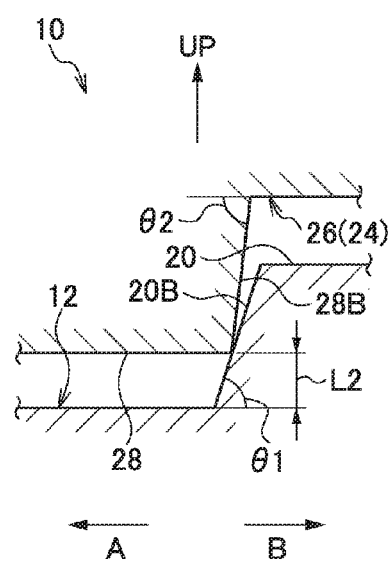

As shown in FIG. 1A and FIG. 1B, the slope angle of the first fixed face 20A with respect to the housing direction and the slope angle of the second fixed face 20B with respect to the forward folded direction are $\theta 1$.

Figure 5:
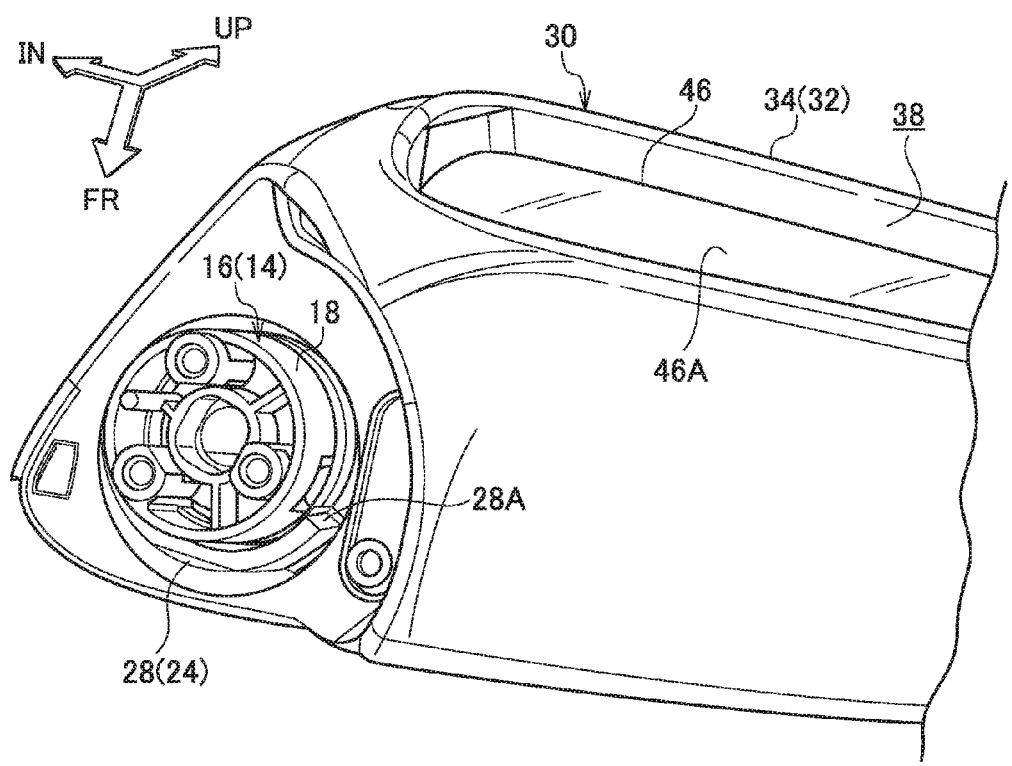
FIG. 5 is a perspective view illustrating a housing device and a mirror of a vehicle door mirror device according to the first exemplary embodiment of the present invention, as viewed diagonally from below the vehicle rear.

As shown in FIG. 3 and FIG. 5, a housing device 14 (retractor) serving as a housing section is supported by the support projection 12A of the stay 12.

A stand 16, made from metal or resin and serving as a support portion configuring the support body, is provided to the housing device 14. A circular column shaped fixed column 18 is provided at the bottom end portion of the stand 16. The fixed column 18 is inserted into the fix hole 48 of the support projection 12A, and the fixed column 18 is fixed to the support projection 12A in a state in which the fixed column 18 is coaxially disposed with respect to the fix hole 48. The housing device 14 is thereby supported by the stay 12.

The upper face of the fixed column 18 is integrally formed with a circular cylindrical shaped support shaft 22 (see FIG. 2). The support shaft 22 projects towards above of the fixed column 18 and is disposed coaxially to the fixed column 18.

An elongated curved plate shaped fixed convex portion (not shown in the drawings) serving as a restricting section is integrally formed to the fixed column 18. The fixed convex portion projects upwards, is elongated along the circumferential direction of the fixed column 18 and curves in a circular arc shape centered on the center axis line of the fixed column 18.

A drive body 24 configuring a rotating body is supported by the stand 16. The support shaft 22 is inserted into the drive body 24, and the drive body 24 is biased downwards with respect to the stand 16. The drive body 24 rotates with respect to the stand 16 about a central axis of the support shaft 22 when the housing device 14 is driven.

A column shaped rotating convex portion (not shown in the drawings) configuring a restricting section is integrally provided to the drive body 24. The rotating convex portion projects downwards. The rotating convex portion is disposed in a concave portion which is along the circumferential direction of the fixed column 18 between one elongation direction end face and the other elongation direction end face of the fixed convex portion of the stand 16. The rotating convex portion makes contact with the one elongation direction end face of the fixed convex portion.

A case 26 is provided at the outer periphery of the drive body 24. The case 26 is made from the same or a similar type of resin to that of the stay 12.

The bottom (lower) face of the case 26 is integrally formed with an elongated curved plate shaped rotating projection 28 (stopper) that serves as an inhibit portion and a low strength portion. The rotating projection 28 projects out downwards and is curved in a circular arc shape centered on the rotation center axis line of the drive body 24 (the center axis line O in FIG. 2). The rotating projection 28 has a lower strength than that of the fixed projection 20 of the stay 12. If the same moment (a shear load with respect to the projecting base end) acts on the fixed projection 20 and the rotating projection 28 along the length direction (the circumferential direction of the fix hole 48), the rotating projection 28 is more readily damaged, particularly at the projecting base end portion, than the fixed projection 20.

An end face of the rotating projection 28 on the housing direction (the other direction along the rotating direction) side is configured by a flat plane shaped first rotating face 28A serving as an inhibition (stopping) face. The first rotating face 28A is disposed parallel to the rotation radial direction of the drive body 24 (the radial direction of the fix hole 48). The first rotating face 28A slopes (inclines) towards the forward folded direction side on progression downwards (towards the projecting leading end side of the rotating projection 28). The lower side portion of the first rotating face 28A is arranged to the forward folded direction side with respect to the upper side portion of the first rotating face 28A (the projecting base end side of the rotating projection 28).

An end face of the rotating projection 28 on the forward folded direction (one direction along the rotating direction) side is configured by a flat plane shaped second rotating face 28B serving as an inhibition (stopping) face. The second rotating face 28B is disposed parallel to the rotation radial direction of the drive body 24. The second rotating face 28B slopes (inclines) towards the housing direction side on progression downwards (towards the projecting leading end side of the rotating projection 28). The lower side portion of the second rotating face 28B is arranged to the housing direction side with respect to the upper side portion of the second rotating face 28B (the projecting base end side of the rotating projection 28).

As shown in FIG. 1A and FIG. 1B, the slope angle of the first rotating face 28A with respect to forward folded direction and the slope angle of the second rotating face 28B with respect to the housing direction are $\theta 2$. As a restricting structure, the slope angle $\theta 1$ of the first fixed face 20A with respect to the housing direction and the slope angle $\theta 1$ of the second fixed face 20B with respect to the forward folded direction are set smaller than the slope angle $\theta 2$ of the first rotating face 28A with respect to the forward folded direction and slope angle $\theta 2$ of the second rotating face 28B with respect to the housing direction.

As shown in FIG. 2, FIG. 3 and FIG. 5, a main body portion 30 is supported by the drive body 24 of the housing device 14.

A visor 32, made from resin and configuring the rotating body, is provided to the main body portion 30. A visor body 34 serving as a visor main body is provided to the visor 32. The vehicle front side of a vehicle width direction inside portion of the visor body 34 is fixed to the drive body 24. The visor 32 is thereby supported by the drive body 24, and the main body portion 30 is supported by the drive body 24. The main body portion 30 is accordingly capable of rotating integrally with the drive body 24. The main body portion 30 is disposed in a standing position (jutting-out position) (a deployed position illustrated by the solid lines in FIG. 2). The main body portion 30 projects out to the vehicle width direction outside of the stay 12 so standing (deployed).

A curved plate shaped visor cover 36 serving as a cover member is provided to the vehicle front side of the visor body 34. The visor cover 36 is assembled to the visor body 34. The visor cover 36 accordingly covers the visor body 34 from the vehicle front side, housing the drive body 24 between the visor cover 36 and the visor body 34.

A substantially rectangular parallelepiped (box) shaped housing chamber 38 is formed at a vehicle rear side portion of the visor body 34. The housing chamber 38 is open at the vehicle rear side face.

A mirror surface adjustment device 40 (drive unit) serving as a mirror surface adjustment section configuring the rotating body is provided inside the housing chamber 38. A fixing portion 42 is provided at the vehicle front side of the mirror surface adjustment device 40. The fixing portion 42 is fixed to the floor (bottom) wall (the vehicle front side wall) of the housing chamber 38, and the mirror surface adjustment device 40 is accordingly supported by the visor body 34.

A tilting plate 44 serving as an assemble portion is supported at the vehicle rear side of the fixing portion 42, such that the tilting plate 44 is capable of tilting with respect to the fixing portion 42.

A substantially rectangular plate shaped mirror 46 is assembled to the tilting plate 44. The mirror 46 is housed inside the housing chamber 38 of the visor body 34 in a state in which a mirror face 46A faces towards the vehicle rear side. The mirror 46 is tilted integrally with the tilting plate 44 by the tilting plate 44 tilting with respect to the fixing portion 42 when the mirror surface adjustment device 40 is driven, thereby adjusting the angle of the mirror face 46A of the mirror 46.

Explanation follows regarding operation of the present exemplary embodiment.

In the vehicle door mirror device 10 configured as described above, the main body portion 30 is rotated integrally with the drive body 24 from the jutting-out position (the deployed position illustrated by the solid line in FIG. 2) in the housing direction (towards the vehicle rear side and the vehicle width direction inside) by driving the housing device 14 or by inputting external force to the main body portion 30 (in particular to the visor 32). The main body portion 30 (including the mirror 46) is thereby arranged in the housed position (the rear housed position, the position illustrated by the double dot intermittent line in FIG. 2) and housed (rear-housed).

The main body portion 30 (including the mirror 46) is returned to the jutting-out position, so as to jut out, by the main body portion 30 being rotated integrally with the drive body 24 from the housed position in the forward folded direction (towards the vehicle front side and the vehicle width direction outside), by driving the housing device 14 or inputting external force to the main body portion 30 (in particular to the visor 32).

When the main body portion 30 is being arranged from the jutting-out position to the housed position, the rotating convex portion of the drive body 24 is arranged in the concave portion between one elongation direction end face and the other elongation direction end face of the fixed convex portion of the stand 16. When the main body portion 30 is arranged in the jutting-out position, the rotation of the main body portion 30 is caught (stopped) in the jutting-out position by the rotation convex portion making contact with one elongation direction end face of the fixed convex portion.

The main body portion 30 is rotated integrally with the drive body 24 from the jutting-out position (the deployed position illustrated by the solid line in FIG. 2) in the forward folded direction (towards the vehicle front side and the vehicle width direction inside) by inputting external force (a large rotation force such as by hand or due to a collision) to the main body portion 30 (in particular to the visor 32). The main body portion 30 (including the mirror 46) is thereby arranged in the forward folded position (the front housed position, the position illustrated by the single dot intermittent line in FIG. 2), forward-folded (forward housed).

The main body portion 30 (including the mirror 46) is returned to the jutting-out position, where it juts out, by the main body portion 30 being rotated integrally with the drive body 24 from the forward folded position in the housing direction (towards the vehicle rear side and the vehicle width direction outside), by inputting external force (a large rotation force such as by hand or due to a collision) to the main body portion 30 (in particular to the visor 32).

When the main body portion 30 is arranged further to the forward folded direction side than the jutting-out position, the rotating convex portion of the drive body 24 rides up on the fixed convex portion of the stand 16 against the downwards biasing force to the drive body 24 with respect to the stand 16. Hence when the main body portion 30 is arranged further to the forward folded direction side than the jutting-out position (see FIG. 1B), the drive body 24 is moved further upwards with respect to the stand 16 than when the main body portion 30 is arranged from the jutting-out position to the housed position (see FIG. 1A).

When the main body portion 30 is arranged in the housed position, the first fixed face 20A of the fixed projection 20 provided to the stay 12 (the support projection 12A) and the first rotating face 28A of the rotating projection 28 provided to the housing device 14 (the case 26 of the drive body 24) make contact with each other (see FIG. 1A and the double dot intermittent line in FIG. 2). Therefore, in this state, even when a large rotation force has been input to the main body portion 30 in the housing direction (towards the vehicle width direction inside), such as for example by hand or due to a collision, rotation of the main body portion 30 in the housing direction is inhibited (not permitted).

Moreover, when the main body portion 30 is arranged in the forward folded position, the second fixed face 20B of the fixed projection 20 provided to the stay 12 (the support projection 12A) and the second rotating face 28B of the rotating projection 28 provided to the housing device 14 (the case 26 of the drive body 24) make contact with each other (see FIG. 1B and the single dot intermittent line in FIG. 2). Therefore, in this state, even when a large rotation force has been input to the main body portion 30 in the forward folded direction (towards the vehicle width direction inside), such as for example by hand or due to a collision, rotation of the main body portion 30 in the forward folded direction is inhibited (not permitted).

As shown in FIG. 1A, in the fixed projection 20, the first fixed face 20A slopes towards the forward folded direction side on progression downwards, with the lower side portion projecting out towards the forward folded direction side with respect to the upper side portion. The slope angle θ1 of the first fixed face 20A with respect to the housing direction is set smaller than the slope angle θ2 of the first rotating face 28A of the rotating projection 28 with respect to the forward folded direction.

Hence when the main body portion 30 is arranged in the housed position, even if the upper end of the first fixed face 20A of the fixed projection 20 (an end of a contact face at a projecting leading end side of a projection portion) and the first rotating face 28A of the rotating projection 28 face each other, contact between the upper end of the first fixed face 20A and the first rotating face 28A can be appropriately restricted, and a distance L1 in the upper-lower direction (the projection direction of the fixed projection 20) from the lower end of the first fixed face 20A (an end of the contact face at a projecting base end side of the projection portion) to the contact position where the first rotating face 28A contacts with the first fixed face 20A can be set suitably short. Accordingly, in this state, even if a large rotation force is input to the main body portion 30 in the housing direction, the moment acting on the first fixed face 20A from the first rotating face 28A can be made suitably small, and damage to the lower end position of the first fixed face 20A of the fixed projection 20 can be appropriately suppressed.

As shown in FIG. 1B, in the fixed projection 20, the second fixed face 20B slopes towards the housing direction side on progression downwards, with the lower side portion projecting towards the housing direction side with respect to the upper side portion. The slope angle θ1 of the second fixed face 20B with respect to the forward folded direction is smaller than the slope angle θ2 of the second rotating face 28B of the rotating projection 28 with respect to the housing direction.

Hence when the main body portion 30 is arranged in the forward folded position, even if the upper end of the second fixed face 20B of the fixed projection 20 and the second rotating face 28B of the rotating projection 28 face each other, contact between the upper end of the second fixed face 20B and the second rotating face 28B can be appropriately restricted, and a distance L2 in the upper-lower direction (the projection direction of the fixed projection 20) from the lower end of the second fixed face 20B to the contact position where the second rotating face 28B contacts with the second fixed face 20B can be made suitably short. Therefore, in this state, even when a large rotation force is input to the main body portion 30 in the forward folded direction, the moment acting on the second fixed face 20B from the second rotating face 28B can be made appropriately small, and damage to the lower end position of the second fixed face 20B of the fixed projection 20 can be appropriately suppressed.

Due to the above, the need to make the fixed projection 20 of the stay 12 from a high strength material (Zinc Die-Cast (ZDC), Aluminum Die-Casting (ADC) or the like), or to increase the size of the fixed projection 20 can be eliminated, enabling the cost and weight of the vehicle door mirror device 10 to be reduced.

Test Examples

Figure 6:
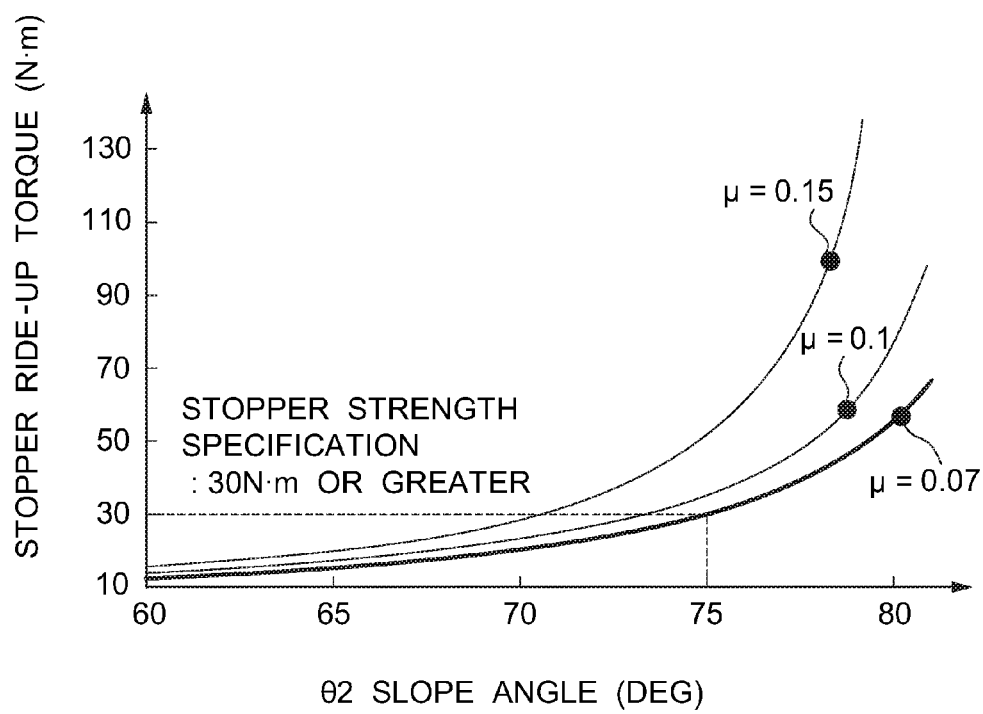
FIG. 6 is a graph showing results of Test Examples of vehicle door mirror devices according to the first exemplary embodiment of the present invention.

FIG. 6 is a graph illustrating relationships between slope angle θ2 of the first rotating face 28A of the rotating projection 28 with respect to the forward folded direction and the slope angle θ2 of the second rotating face 28B of the rotating projection 28 with respect to the housing direction (on the horizontal axis), and the rotation torque (on the vertical axis) of the rotating projection 28 required to cause the rotating projection 28 to ride up on the fixed projection 20 when the main body portion 30 is arranged in the housed position or the main body portion 30 is arranged in the forward folded position.

In the Test Examples, the slope angle θ1 of the first fixed face 20A of the fixed projection 20 with respect to the housing direction, the slope angle θ1 of the second fixed face 20B of the fixed projection 20 with respect to the forward folded direction, the slope angle θ2 of the first rotating face 28A of the rotating projection 28 with respect to the forward folded direction and the slope angle θ2 of the second rotating face 28B of the rotating projection 28 with respect to the housing direction are set (premised) such that:

$$\theta2 \leq 90°$$ Equation (1)

$$\theta2 - \theta1 \geq 4°$$ Equation (2)

In order to inhibit (prevent) rotation of the main body portion 30 in the housing direction when the main body portion 30 is disposed in the housed position, and in order to inhibit (prevent) rotation of the main body portion 30 in the forward folded direction when the main body portion 30 is disposed in the forward folded position, it is generally necessary to configure such that a rotation torque of 30 N·m or greater of the rotating projection 28 is required to cause the rotating projection 28 to ride up on the fixed projection 20.

Therefore it can be seen from FIG. 6 that the following is required, irrespective of whether the coefficient of friction μ between the rotating projection 28 and the fixed projection 20 is 0.07, 0.10, or 0.15:

$$\theta1 \geq 75°$$ Equation (3).

Due to the above, it can be seen from Equation (1) to Equation (3) that the following is required in order to inhibit rotation of the main body portion 30 in the housing direction when the main body portion 30 is disposed in the housed position, and in order to inhibit rotation of the main body portion 30 in the forward folded direction when the main body portion 30 is disposed in the forward folded position:

$$75° \leq \theta1 \leq 86°$$ Equation (4)

Second Exemplary Embodiment

Figure 7A:
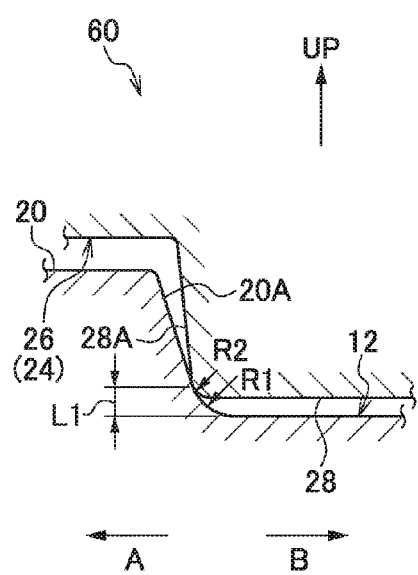
FIG. 7A and FIG. 7B are cross-sections illustrating main portions of a vehicle door mirror device according to a second exemplary embodiment of the present invention, as viewed from the side.
Figure 7B:
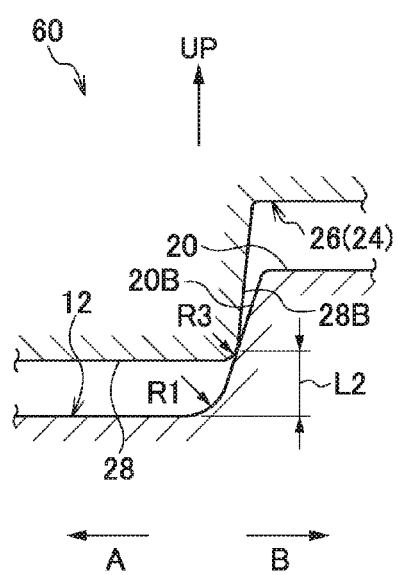

FIG. 7A and FIG. 7B illustrate cross-sections of main portions of a vehicle door mirror device 60 according to a second exemplary embodiment applied with the mirror device for a vehicle of the present invention, as viewed from the side.

The vehicle door mirror device 60 according to the second exemplary embodiment is configured substantially the same as in the first exemplary embodiment, however it differs with respect to the following points.

As shown in FIG. 7A and FIG. 7B, the vehicle door mirror device 60 according to the second exemplary embodiment is configured that, at a support projection 12A of a stay 12, a lower end portion of the first fixed face 20A of the fixed projection 20 (a concave corner portion) and a lower end portion of the second fixed face 20B of the fixed projection 20 (a concave corner portion) are curved in concave shapes. The radii of curvature of the lower end portion of the first fixed face 20A and the lower end portion of the second fixed face 20B are set at R1.

In the drive body 24 (case 26) of the housing device 14, a lower end portion of the first rotating face 28A of the rotating projection 28 (a convex corner portion) and a lower end portion of the second rotating face 28B of the rotating projection 28 (a convex corner portion) are curved in convex shapes. The radius of curvature of the lower end portion of the first rotating face 28A is R2 and the radius of curvature of the lower end portion of the second rotating face 28B is R3.

The radius of curvature R1 of the lower end portion of the first fixed face 20A, the radius of curvature R1 of the lower end portion of the second fixed face 20B, the radius of curvature R2 of the lower end portion of the first rotating face 28A and the radius of curvature R3 of the lower end portion of the second rotating face 28B are set such that:

$$R1 > R2 > R3$$ Equation (5)

Similar operations and effect effects can also be exhibited by the second exemplary embodiment to those of the first exemplary embodiment.

The lower end portion of the first fixed face 20A of the fixed projection 20 and the lower end portion of the second fixed face 20B of the fixed projection 20 are curved in concave shapes. Therefore, as shown in FIG. 7A, damage to the lower end position of the first fixed face 20A of the fixed projection 20 can be further suppressed when rotation of the main body portion 30 from the housed position in the housing direction is inhibited by the first fixed face 20A of the fixed projection 20 and the first rotating face 28A of the rotating projection 28 making contact with each other. Moreover, as shown in FIG. 7B, damage to the lower end position of the second fixed face 20B of the fixed projection 20 can be further suppressed when rotation of the main body portion 30 from the forward folded position in the forward folded direction in inhibited by the second fixed face 20B of the fixed projection 20 and the second rotating face 28B of the rotating projection 28 making contact with each other.

As shown in FIG. 7A, the radius of curvature R2 of the lower end portion of the first rotating face 28A is set smaller than the radius of curvature R1 of the lower end portion of the first fixed face 20A. Therefore, when the main body portion 30 is arranged in the housed position, the distance L1 in the upper-lower direction from the lower end of the first fixed face 20A to the contact position with the first rotating face 28A can be made shorter than in cases where the radius of curvature R2 of the lower end portion of the first rotating face 28A is larger than the radius of curvature R1 of the lower end portion of the first fixed face 20A. Hence, even when a large rotation force is input to the main body portion 30 in the housing direction, the moment acting on the first fixed face 20A from the first rotating face 28A can be made appropriately small, and damage to the lower end position of the first fixed face 20A of the fixed projection 20 can be appropriately suppressed.

As shown in FIG. 7B, the radius of curvature R3 of the lower end portion of the second rotating face 28B is smaller than the radius of curvature R1 of the lower end portion of the second fixed face 20B. Therefore, when the main body portion 30 is arranged in the forward folded position, the distance L2 in the upper-lower direction from the lower end of the second fixed face 20B to the contact position with the second rotating face 28B can be set shorter in comparison to cases in which the radius of curvature R3 of the lower end portion of the second rotating face 28B is larger than the radius of curvature R1 of the lower end portion of the second fixed face 20B.

Further, as shown in FIG. 7A and FIG. 7B, the radius of curvature R3 of the lower end portion of the second rotating face 28B is smaller than the radius of curvature R2 of the lower end portion of the first rotating face 28A. Therefore the distance L2 in the upper-lower direction from the lower end of the second fixed face 20B to the contact position with the second rotating face 28B can be made shorter even if, when the main body portion 30 is arranged in the forward folded position, the main body portion 30 is arranged further upwards than the position of the main body portion 30 (the rotating projection 28) when the main body portion 30 is arranged in the housed position.

Consequently, when the main body portion 30 is arranged in the forward folded position, even when a large rotation force is input to the main body portion 30 in the forward folded direction, the moment acting on the second fixed face 20B from the second rotating face 28B can be made appropriately small, and damage to the lower end position of the second fixed face 20B of the fixed projection 20 can be appropriately suppressed.

Note that in the second exemplary embodiment, all of the concave corner portions of the fixed projection 20 and the convex corner portions of the rotating projection 28 are curved. However, a part of the concave corner portions of the fixed projection 20 and the convex corner portions of the rotating projection 28 may be curved.

Note that in the first exemplary embodiment and the second exemplary embodiment the restricting structure of the present invention is configured by the lower (bottom) side portion of the first fixed face 20A of the fixed projection 20 projecting out towards the forward folded direction with respect to the upper (top) side portion of the first fixed face 20A, and by the lower side portion of the second fixed face 20B of the fixed projection 20 projecting out towards the housing direction side with respect to the upper side portion of the second fixed face 20B.

However, as the restricting structure the present invention, for example, the lower end portion of the first rotating face 28A of the rotating projection 28 may be made to project out further to the housing direction side than the upper side portion of the first rotating face 28A, and the lower side portion of the second rotating face 28B of the rotating projection 28 may be made to project out further to the forward folded direction side than the upper side portion of the second rotating face 28B.

In the first exemplary embodiment and the second exemplary embodiment the strength of the rotating projection 28 is set lower than that of the fixed projection 20. However, the strength of the fixed projection 20 may be set lower than the rotating projection 28, and the strength of the rotating projection 28 and the fixed projection 20 may also be set the same as each other.

In the first exemplary embodiment and the second exemplary embodiment, contact is restricted between the upper end of the first fixed face 20A of the fixed projection 20 and the first rotating face 28A of the rotating projection 28, and contact is also restricted between the upper end of the second fixed face 20B of the fixed projection 20 and the second rotating face 28B of the rotating projection 28. However, configuration may be made such that contact is restricted between the first fixed face 20A of the fixed projection 20 and the lower end of the first rotating face 28A of the rotating projection 28 and contact is restricted between the second fixed face 20B of the fixed projection 20 and the lower end of the second rotating face 28B of the rotating projection 28.

Moreover, in the first exemplary embodiment and the second exemplary embodiment, the fixed projection 20 and the rotating projection 28 project out in the upper-lower direction (the rotation axis direction of the rotating projection 28). However, configuration may be made such that the fixed projection 20 and the rotating projection 28 project out in rotation radial direction of the rotating projection 28.

In the first exemplary embodiment and the second exemplary embodiment, the fixed projection 20 is provided to the stay 12, and the rotating projection 28 is provided to the drive body 24. However, the fixed projection 20 may be provided to the stand 16 and the rotating projection 28 may, for example, be provided to the visor 32.

In the first exemplary embodiment and the second exemplary embodiment, the mirror device for a vehicle of the present invention is applied to the vehicle door mirror device 10 and 60. However, the mirror device for a vehicle of the present invention may be applied to another outer mirror for a vehicle device which is at the outside of the vehicle (for example to a vehicle fender mirror device) or may be applied to a vehicle inner mirror device which is at the inside of the vehicle.

What is claimed is:

1. A mirror device for a vehicle comprising:
   a support body that is supported at a vehicle body side;
   a rotating body that is supported at the support body, the rotating body supporting a mirror of the vehicle and housing the mirror by rotating with respect to the support body;
   an inhibit portion that is fixed to one of the support body or the rotating body, the inhibit portion having an inhibit portion face;
   a projection portion that is fixed to and projects from the other of the support body or the rotating body, and is provided with a contact face, rotation of the rotating body with respect to the support body being inhibited by the inhibit portion and the contact face making contact with each other in a state in which the inhibit portion face and an end of the contact face at a side of a projecting leading end of the projection portion face each other without contacting each other; and
   a restricting structure including an edge bordering the inhibit portion face that restricts contact between the inhibit portion face and the end of the contact face at the side of the projecting leading end.

2. The mirror device for a vehicle of claim 1, wherein the restricting structure is further configured by the contact face at a side of a projecting base end of the projecting portion projecting out with respect to the contact face at the side of the projecting leading end, towards a side of a direction of contact of the contact face with the inhibit portion.

3. The mirror device for a vehicle of claim 2, wherein a side face of the projecting base end of the projection portion, at a side of contact with the inhibit portion, is curved.

4. The mirror device for a vehicle of claim 2, wherein a radius of curvature, of a contact portion of the inhibit portion with the contact face, is set smaller than a radius of curvature of the side face of the projection base end of the projection portion at the side of contact with the inhibit portion.

5. The mirror device for a vehicle of claim 3, wherein a radius of curvature, of a contact portion of the inhibit portion with the contact face, is set smaller than a radius of curvature of the side face of the projection base end of the projection portion at the side of contact with the inhibit portion.

6. A mirror device for a vehicle comprising:
   a support body that is supported at a vehicle body side;
   a rotating body that is supported at the support body, the rotating body supporting a mirror of the vehicle and housing the mirror by rotating with respect to the support body;
   an inhibit portion that is provided at one of the support body or the rotating body;
   a projection portion that is provided so as to project from the other of the support body or the rotating body, wherein
   the projection portion is a member that is curved along a rotating direction of the rotating body, an end portion thereof at one side in the rotating direction is a first projection portion face and an end portion thereof at the other side in the rotating direction is a second projection portion face,
   the inhibit portion is a member that is curved along a rotating direction of the rotating body, an end portion thereof at the other side in the rotating direction is a first inhibit portion face and an end portion thereof at the one side in the rotating direction is a second inhibit portion face,
   the first inhibit portion face, the second inhibit portion face, the first projection portion face and the second projection portion face are inclined surfaces that are inclined with respect to the rotating direction,
   rotation of the rotating body with respect to the support body is inhibited by the first inhibit portion face and the first projection portion face making contact with each other in a state in which the first inhibit portion face and an end of the first projection portion face at a side of a projecting leading end of the projection portion face each other without contacting each other, or by the second inhibit portion face and the second projection portion face making contact with each other in a state in which the second inhibit portion face and an end of the second projection portion face at a side of a projecting leading end of the projection portion face each other without contacting each other, and
   a restricting structure is provided including first and second edges bordering the first and second inhibit portion faces, respectively, which restricts contact between the first inhibit portion face and the end of the first projection portion face at the side of the projecting leading end of the projection portion and which restricts contact between the second inhibit portion face and the end of the second projection portion face at the side of the projecting leading end.

7. The mirror device for a vehicle of claim 6, wherein, in the restricting structure:
   a slope angle of the first projection portion face with respect to the other side in the rotating direction is set smaller than a slope angle of the first inhibit portion face with respect to the one side in the rotating direction, and
   a slope angle of the second projection portion face with respect to the one side in the rotating direction is set smaller than a slope angle of the second inhibit portion face with respect to the other side in the rotating direction.

8. The mirror device for a vehicle of claim 1, wherein the restricting structure includes:
   the contact face of the projection portion, which is an end face of the projection portion in a rotating direction of the rotating body; and
   an inhibit portion contact face of the inhibit portion, which is an end face of the inhibit portion in the rotating direction of the rotating body, and
   the restricting structure is configured in that, at contacting of the contact face and the inhibit portion contact face, an end of the inhibit portion contact face at a side of a leading end of the inhibit portion contacts with a base end side of the contact face at a side of a projecting base end of the projection portion in a state in which the inhibit portion contact face and the end of the contact face at the side of the projecting leading end of the projection portion face without contacting each other.

9. The mirror device for a vehicle of claim 8, wherein the rotating body supports the mirror such that the rotating body and the mirror integrally rotate.

10. The mirror device for a vehicle of claim 1, wherein the rotating body supports the mirror such that the rotating body and the mirror integrally rotate.

* * * * *